March 10, 1942.  A. H. MAUDE  2,276,079
PROCESS FOR PRODUCTION OF CHLORINE AND SODIUM SULPHATE
Filed July 29, 1939
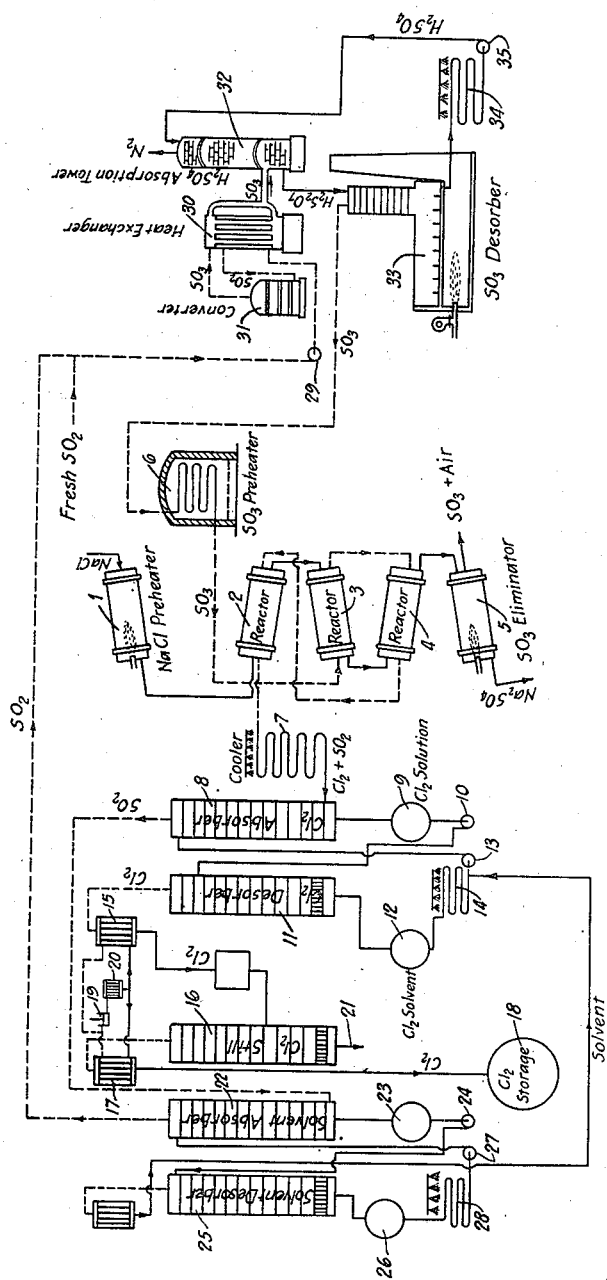
INVENTOR.
Aylmer H. Maude
BY
Kenneth E. Stuart
ATTORNEY Patented Mar. 10, 1942

2,276,079

UNITED STATES PATENT OFFICE 2,276,079

PROCESS FOR PRODUCTION OF CHLORINE AND SODIUM SULPHATE

Aylmer H. Maude, Niagara Falls, N. Y., assignor to Hooker Electrochemical Company, New York, N. Y., a corporation of New York Application July 29, 1939, Serial No. 287,378

9 Claims. (Cl. 23—121)

Prior to the invention of the electrolytic process for production of chlorine and caustic soda from common salt, various processes were proposed for production of chlorine from various chlorides, such as hydrogen, ammonium, calcium, magnesium and sodium chloride. Of these, only the processes starting from sodium chloride were available for production of chlorine from a natural raw material.

With the advent of the electrolytic process, which produces chlorine and caustic soda in fixed ratio, interest in the chemical processes lagged; but fluctuations in demand for chlorine and caustic soda result at times in an excess of one or the other. There is therefore a need for an economical process by which a deficiency in the supply of chlorine can be made up. It is the object of my invention to provide such a process.

All the known processes for production of chlorine by chemical reaction from common salt involve an oxidation. Besides oxygen, another reagent is necessary. This may be a metal sulphide, sulphate or silicate, e. g., $FeS_2$, $Fe_2(SO_4)_3$ or $Al_2(SiO_3)_3$, in which case sodium sulphate or silicate and the oxide of the metal are by-products; or the second reagent may be an oxide of sulphur, phosphorus or silicon, e. g., $SO_2$, $SO_3$, $P_2O_5$ or $SiO_2$, in which case sodium sulphate, phosphate or silicate is the only by-product.

In the process of Deacon British Patent 1,908 of 1871 preheated NaCl is brought into contact with preheated $SO_3$ mixed with more or less $SO_2$ and air or oxygen, in the absence of a catalyst. Theoretically, four molecules of NaCl should react with two of $SO_3$ and one of oxygen to produce two molecules of $Na_2SO_4$ and two of chlorine. However, Deacon found that under the conditions of his reaction, namely at "elevated temperature," only one-half of the $SO_3$ was converted to sulphate, the remainder being reduced to $SO_2$. He oxidized this $SO_2$ back to $SO_3$, by means of air, in a separate reactor, but in the presence of the chlorine liberated by the first reaction, and then passed this $SO_3$, diluted with chlorine and nitrogen, into a third reactor where it was brought into contact with more sodium chloride, and so on, the quantity of $SO_2$ being approximately halved each time and the quantity of chlorine increased until Deacon considered that the proportion of $SO_2$ to chlorine had become negligible. For the purpose of effecting the oxidation of the $SO_2$ he passed the mixture of air, chlorine and $SO_2$ over a heated catalyst, such as clay, iron oxide or copper sulphate. For this oxidation Deacon would have been unable to use efficiently any of the modern highly effective oxidation catalysts, such as platinum or vanadium oxide, on account of the presence of the chlorine.

Deacon also found that NaCl would react with $SO_2$ and air or oxygen to produce chlorine and sodium sulphate, provided one of the catalysts mentioned were present. This fact was taken advantage of by later experimenters (Clem, U. S. Patent 689,461; Kipper, U. S. Patent 1,255,020) who reacted $SO_2$ or $SO_3$ and air with NaCl mixed with balls of clay or iron oxide or other catalyst at 800° to 900° C. The resulting processes are open to the objection that the sodium sulphate becomes mixed with the catalyst. If clay or iron oxide be the catalyst used, it could be allowed to go to waste, but the sodium-sulphate would then be contaminated by the catalyst and unsuitable for many purposes. It is therefore necessary for practical reasons that the catalyst be removed; but this involves an expensive separation. Another disadvantage of these processes is the high temperature of reaction, which necessitates application of heat from external sources.

A still later experimenter (Schmidt, British Patent No. 249,474) asserts that, contrary to the teaching of Deacon, NaCl can be reacted with $SO_3$ and air or oxygen without reduction of any part of the $SO_3$ to $SO_2$. For this purpose, he states, the $SO_3$ must be initially free frm $SO_2$ and should therefore preferably have been evolved from oleum. Although the $SO_3$ produced in this way might easily be kept free from oxygen, he does not do so but mixes it with air, as it is essential for his purpose that oxygen be present. His object in evolving $SO_3$ from oleum is therefore not to avoid air, but to avoid $SO_2$. The temperature of reaction is kept substantially below 600° C. Catalytic substances, such as iron or copper or their sulphates or oxides, are avoided. The NaCl is preferably made up into briquettes and the gases are passed through in counter-flow, so that the weak gases come into contact with fresh NaCl and vice versa. I have found, however, that this reaction is too slow to be commercially practicable.

In the above processes the oxygen can of course be supplied as such or as air, but in the former case the cost of the oxygen would be a serious, if not a prohibitive handicap. For this reason it would be practically necessary to supply the oxygen as air, the chlorine produced being thereby greatly diluted with nitrogen. Thus in the reactions involving $SO_3$ one volume of oxygen is required for two volumes of chlorine produced.

As each volume of oxygen in the air is accompanied by approximately four volumes of nitrogen, it follows that the chlorine of this reaction is theoretically diluted with nearly twice its volume of nitrogen. In the reactions involving $SO_2$ the dilution is twice as great or theoretically about four volumes of nitrogen to one of chlorine. As a matter of fact, as an excess of air is always necessary, the dilution is actually three or six to one, in the two cases respectively. Owing to the inefficiency of the Deacon process the dilution of his chlorine with nitrogen and $SO_2$ was even greater, being of the order of ten to one. As the chlorine was generally intended for absorption in lime for production of bleaching powder, this dilution was not a serious objection; but for many modern uses this chlorine diluted with nitrogen would be unsuitable.

It will therefore be seen that in every process of the prior art, including not only that of Deacon but also those of later disclosures, it is essential that the reaction be carried out in the presence of air, and the chlorine is therefore greatly diluted with nitrogen; also in all the processes of the prior art, with the exception of those of Deacon and Schmidt, the sodium sulphate is mixed with catalyst. It is one of the objects of my invention to produce chlorine, undiluted with nitrogen, by chemical reaction of common salt with sulphur and atmospheric oxygen, without the necessity for first separating the oxygen from the nitrogen of the air. Another object of my invention is to produce anhydrous sodium sulphate, uncontaminated with catalyst, without the necessity for performing an expensive separation or any at all.

My process is of the type in which NaCl is reacted with $SO_3$ but differs from the prior art in that I carry out this reaction without the aid of oxygen and in the absence of catalysts. My principal reaction is therefore as follows:

$$2NaCl + 2SO_3 = Na_2SO_4 + SO_2 + Cl_2 \quad (1)$$

I next separate the $SO_2$ from the chlorine of Equation 1, add it to an equal volume of fresh $SO_2$ and oxidize the augmented $SO_2$ back to $SO_3$ by means of air in presence of a suitable catalyst, in accordance with the following reaction:

$$2SO_2 + O_2 = 2SO_3 \quad (2)$$

The $SO_3$ of Equation 2 is freed from nitrogen of the air by absorbing it in sulphuric acid and re-evolving it from the oleum thus produced. In this way I am enabled to produce chlorine undiluted with nitrogen without going to the expense of isolating oxygen from the air. At the same time I am enabled to produce sodium sulphate uncontaminated with catalyst without the necessity for any purification.

Reaction 1 is exothermic. It is started by preheating the salt and sulphur trioxide to about 350° C. The temperature of reaction must be kept below 804° C., the melting point of NaCl, and should preferably be considerably lower, as this temperature is very destructive of the reactor; moreover, the $NaCl-Na_2SO_4$ mixture resulting during the reaction begins to be mushy above 620° C. On the other hand, the reaction will not go to completion below 580° C. The preferred temperature limits are therefore 580° to 620° C. and the practical limits are 550° to 650° C. Under these conditions the reaction goes to completion in about ten minutes.

The separation of the $SO_2$ from the chlorine is accomplished in my process by passing the mixture through a selective solvent in which either one of the gases is very much more soluble than the other, such as stannic chloride, carbon tetrachloride or preferably sulphur dichloride. Or the separation may be performed by cooling to −103° C., at which temperature the chlorine is liquid and the $SO_2$ solid. The chlorine is thus extracted from the mixture. The $SO_2$ may be passed through a non-volatile hydrocarbon, such as a high boiling paraffin to remove any traces of the solvent that may have been carried over by the gas. The chlorine is re-evolved from the solvent by application of heat, with refluxing of the solvent, as in a bubble cap tower, the solution being fed in at the top counter-current with the evolved chlorine.

For the purpose of Reaction 2 I may use the customary sulphuric acid contact process, which utilizes the highly effective but relatively expensive catalysts vanadium oxide or platinum, as there is substantially no loss of catalyst in my process. In this way the oxidation is accelerated and the size of the reactor reduced.

Instead of separating the $SO_2$ from the chlorine, if preferred the products of Reaction 1 may be combined to form sulphuryl chloride by contacting the mixture with a suitable catalyst, such as activated carbon, since the components of the mixture resulting from the reaction are in the correct proportion for that purpose. Or, for certain chlorination reactions, such as chlorination of metals or hydrocarbons, the separation of $SO_2$ from the chlorine may be dispensed with and the anhydrous mixture used as such. This results in a mixture of $SO_2$ with HCl, which is easily separated into its components by taking advantage of the relatively high solubility of HCl in water. The $SO_2$ may then be re-cycled as before. In other words, instead of separating the $SO_2$ from the chlorine by selective solution or freezing, these gases may be separated by a selective chemical reaction, which may be incident to the next process in which the chlorine is to be utilized, thus causing the latter process to serve a double purpose.

The sodium sulphate produced as above described may contain traces of $SO_3$ as pyrosulphate. This may be removed by heating to a temperature of about 700° C.

It should be noted that, although the dilute chlorine of the prior art could be concentrated by selective solution, the operation would not be comparable with the corresponding operation in my process, for the following reasons:

In my process the chlorine is accompanied by an equal volume of $SO_2$. It has been shown above that in the processes of the prior art the chlorine is accompanied by three to six or even ten times its volume of other gases, principally nitrogen. Therefore, on the score of the volume of gases to be dealt with, if on no other, the concentration of the chlorine is obviously much easier in my process. Moreover, owing to the absence of inert gases, Reaction 1 takes place in my process much more readily and completely and at lower temperatures than the corresponding reactions in the prior processes. The reactor used in my process may therefore be much smaller and less expensive than those heretofore used and the loss of heat is correspondingly less. The pure anhydrous sodium sulphate produced by my process is a valuable material for use in the paper and other industries. All these factors combine to render my process far more practicable than those of the prior art. Thus Deacon carried out his process in a series of six or more partial reactions, without any removal of chlorine or replenishment of $SO_3$, produced extremely dilute chlorine and obtained only a partial conversion of his NaCl to $Na_2SO_4$. Clem and Kipper employ excessively high temperatures which are very destructive of the apparatus, produce chlorine diluted with nitrogen in the proportion of about six to one and sodium sulphate contaminated with catalyst. Schmidt produces chlorine diluted with nitrogen in the proportion of about three to one, and his reaction is very slow. Although there is in my process no such series of partial reactions as in the Deacon process, I preferably carry out Reaction 1 in an apparatus comprising three reactors, which may be brick-lined rotary kilns of well-known type, two of these serving as economizers.

Referring to the drawing:

1 is an inclined rotary kiln for preheating the salt and 2, 3 and 4 reactors of similar type for carrying out Reaction 1. 5 is a kiln used for purifying the sodium sulphate of traces of $SO_3$. The salt is fed into kiln 1, where it is heated by means of a gas flame. The heated salt passes to reactor 2 and the solid products of reaction pass thence in succession through reactors 3 and 4 and kiln 5. Anhydrous $SO_3$, preheated in heater 6, is admitted to the lower end of reactor 3, whence the gaseous products of reaction pass successively through reactors 4 and 2. The gaseous effluent from reactor 3 consists of chlorine and $SO_2$, with traces of $SO_3$. The solid effluent from reactor 3 consists of sodium sulphate containing traces of $SO_3$ as sodium pyrosulphate. Both these effluents are thoroughly contacted in reactor 4, where the gases take out a considerable part of the $SO_3$ from any pyrosulphate present. The solid product is then roasted in kiln 5 to expel any traces of $SO_3$ remaining. The gases containing a minor proportion of $SO_3$ are led from reactor 4 through reactor 2. In this way any residual $SO_3$ is brought into contact with a large surface of fresh heated salt and thereby removed from the gases. The latter discharged from reactor 2 after being cooled in coils 7 are led thence to absorption tower 8, where the chlorine is taken into solution. The solution is collected in receiver 9, whence it is raised by pump 10, to the top of desorption tower 11. Thence the solvent is collected in receiver 12 and returned by pump 13 to the top of tower 8, after being cooled in coil 14.

The chlorine leaving tower 11 is liquefied in cooler 15, redistilled in still 16, reliquefied in cooler 17 and delivered to storage 18. Coolers 15 and 17 are operated by the $CO_2$ system comprising pump 19 and cooler 20. Residue and traces of sulphuryl chloride are discharged from still 16 at 21.

The $SO_2$ from tower 8 passes to scrubbing tower 22 where it is scrubbed free from the chlorine solvent by means of a non-volatile hydrocarbon, which is collected in receiver 23 and raised by pump 24 to the top of desorption tower 25. There is passes to receiver 26 and is returned to the top of tower 22 by pump 27 after having been first cooled in coils 28.

The scrubbed $SO_2$ from tower 22, augmented by an equal quantity of fresh $SO_2$, produced from sulphur or pyrites in apparatus not shown and diluted with air, is delivered by pump 29 to the oxidizing equipment consisting of heat exchanger 30 and converter 31. In converter 31 the mixture of hot air and gas passes over an oxidation catalyst, whereby the $SO_2$ is oxidized to $SO_3$. From this converter the $SO_3$, mixed with nitrogen of the air, passes to sulphuric acid tower 32. The oleum from tower 32 is distilled in furnace 33. The sulphuric acid, after having been cooled in coils 34, is returned by pump 35 to tower 32. The evolved $SO_3$ is passed through preheater 6 and thence to the lower end of reactor 3, as at the beginning of the process.

Although I have described my process as a continuous one, I do not wish to be limited thereto, as it could obviously be operated as a batch process by converting the $SO_2$ to $SO_3$ and recycling it to a batch of NaCl until the latter was completely converted to $Na_2SO_4$.

Since there exist uses for concentrated $SO_2$, which is difficult to produce by ordinary methods, and since the $SO_2$ in my process is concentrated and entirely suited to such uses, it might be regarded as a valuable by-product or even as a second principal product. If diverted to such uses it would be replaced entirely by fresh $SO_3$, which can be easily concentrated by the method above described. I do not wish to be limited therefore to the recycling of the $SO_2$.

It will be seen from the foregoing that in all the processes of the prior art for production of chlorine from sodium chloride and sulphur dioxide or trioxide, without exception, the objective has been to carry the reaction to the point where all the sulphur would be in the form of sulphate, before removing any chlorine from the reaction. This involved supplying atmospheric oxygen to the reaction and resulted in dilution of the chlorine with three to six times its volume of nitrogen. The chlorine could not be separated from the nitrogen by any commercially feasible means and such diluted chlorine would be unsuitable for many modern purposes. I have found, however, that it is entirely practicable to extract chlorine from an equimolecular mixture with sulphur dioxide. Therefore, instead of trying to carry the reaction completely to sulphate, I carry it to sulphate and sulphur dioxide in accordance with Reaction 1 and separate the chlorine from the sulphur dioxide. I may then use the resulting anhydrous sulphur dioxide as a valuable by-product or recycle it in accordance with Reaction 2.

I claim as my invention:

1. The process which comprises reacting substantially undiluted sulphur trioxide with sodium chloride at 550° C. to 650° C. in the substantial absence of free oxygen, to produce sodium sulphate and a mixture of chlorine and sulphur dioxide in substantially equimolecular proportions substantially undiluted with other gases, removing the gaseous from the solid products of reaction, separating said chlorine from said sulphur dioxide, augmenting said sulphur dioxide with a substantially equal quantity of fresh sulphur dioxide, oxidizing said augmented sulphur dioxide to sulphur trioxide by means of air in presence of a suitable catalyst, absorbing the augmented sulphur trioxide in sulphuric acid, recovering said sulphur trioxide substantially undiluted from said sulphuric acid by application of heat thereto and reacting the augmented sulphur trioxide with more sodium chloride.

2. The process which comprises reacting substantially undiluted sulphur trioxide with sodium chloride at 550° C. to 650° C. in the substantial absence of free oxygen or any catalyst, to produce sodium sulphate uncontaminated with catalyst and a mixture of chlorine and sulphur dioxide in substantially equimolecular proportions substantially undiluted with other gases, removing the gaseous from the solid products of reaction, separating said chlorine from said sulphur dioxide, augmenting said sulphur dioxide with a substantially equal quantity of fresh sulphur dioxide, oxidizing said augmented sulphur dioxide to sulphur trioxide by means of air in presence of a suitable catalyst, absorbing the augmented sulphur trioxide in sulphuric acid, recovering said sulphur trioxide substantially undiluted from said sulphuric acid by application of heat thereto and reacting the augmented sulphur trioxide with more sodium chloride.

3. The process which comprises reacting substantially undiluted sulphur trioxide with sodium chloride at 550° C. to 650° C. in the substantial absence of free oxygen, to produce sodium sulphate and a mixture of chlorine and sulphur dioxide in substantially equimolecular proportions substantially undiluted with other gases, removing the gaseous from the solid products of reaction, absorbing said chlorine in a solvent inert with respect thereto in which sulphur dioxide is relatively insoluble, recovering said chlorine from said solvent by application of heat thereto, augmenting said sulphur dioxide with a substantially equal quantity of fresh sulphur dioxide, oxidizing said augmented sulphur dioxide to sulphur trioxide by means of air in presence of a suitable catalyst, absorbing the augmented sulphur trioxide in sulphuric acid, recovering said sulphur trioxide substantially undiluted from said sulphuric acid by application of heat thereto and reacting the augmented sulphur trioxide with more sodium chloride.

4. The process which comprises reacting substantially undiluted sulphur trioxide with sodium chloride at 550° C. to 650° C. in the substantial absence of free oxygen, to produce sodium sulphate and a mixture of chlorine and sulphur dioxide in substantially equimolecular proportions substantially undiluted with other gases, removing the gaseous from the solid products of reaction, absorbing said chlorine in a solvent of the group consisting of stannic chloride, carbon tetrachloride and sulphur dichloride, recovering said chlorine from said solvent by application of heat thereto, augmenting said sulphur dioxide with a substantially equal quantity of fresh sulphur dioxide, oxidizing said augmented sulphur dioxide to sulphur trioxide by means of air in presence of a suitable catalyst, absorbing the augmented sulphur trioxide in sulphuric acid, recovering said sulphur trioxide substantially undiluted from said sulphuric acid by application of heat thereto and reacting the augmented sulphur trioxide with more sodium chloride.

5. A cyclic process of producing chlorine which comprises reacting substantially undiluted sulphur trioxide with sodium chloride in the substantial absence of free oxygen and at a temperature required to produce sodium sulphate and a mixture of chlorine and sulphur dioxide in substantially equimolecular proportions, removing said gaseous mixture from the solid products of the reaction, separating said chlorine from said sulphur dioxide, mixing said sulphur dioxide with burner gases containing air and sulphur dioxide, catalytically oxidizing the sulphur dioxide in the resulting gas mixture to sulphur trioxide, absorbing the sulphur trioxide in sulphuric acid to produce oleum, heating the resulting oleum to recover undiluted sulphur trioxide and reacting the same with more sodium chloride in the first reaction stage for continued production of chlorine.

6. The process which comprises reacting substantially undiluted sulphur trioxide with sodium chloride in substantially equimolecular proportions at 580° C. to 620° C. in the substantial absence of free oxygen or any catalyst, to produce sodium sulphate uncontaminated with catalyst and a mixture of chlorine and sulphur dioxide in substantially equimolecular proportions substantially undiluted with other gases, removing the gaseous from the solid products of reaction, absorbing said chlorine in a solvent inert with respect thereto in which said sulphur dioxide is relatively insoluble, recovering said chlorine from said solvent by application of heat thereto, augmenting said sulphur dioxide with a substantially equal quantity of fresh sulphur dioxide, oxidizing said augmented sulphur dioxide to sulphur trioxide by means of air in presence of a suitable catalyst, absorbing the augmented sulphur trioxide in sulphuric acid, recovering said sulphur trioxide substantially undiluted from said acid by application of heat thereto and reacting the augmented sulphur trioxide with more sodium chloride.

7. In the process for production of chlorine, sulphur dioxide and sodium sulphate by reaction of sodium chloride with sulphur trioxide the steps which comprise passing preheated sodium chloride through a reaction chamber and there contacting it counterflow with gases hereinafter specified, passing the residual solid products from said reaction chamber through a second reaction chamber and there contacting them counterflow with preheated substantially undiluted sulphur trioxide, passing the residual solid products from said second reaction chamber through a third reaction chamber and there contacting them counterflow with the gaseous products from said second reaction chamber and passing the gaseous products from said third reaction chamber through said first reaction chamber and there contacting them counterflow with said sodium chloride.

8. The process as claimed in claim 7 in which the sodium chloride and sulphur trioxide are each preheated to substantially 350° C.

9. The process as claimed in claim 7 in which the reagents are preheated to substantially 350° C. and their rate of passage through the system of reaction chambers is regulated with respect to the capacity of said chambers to maintain a temperature of 550° to 650° C. within said system.

AYLMER H. MAUDE.